United States Patent [19]

Arai

[11] Patent Number: 4,625,711

[45] Date of Patent: Dec. 2, 1986

[54] SOLAR HEAT COLLECTOR

[75] Inventor: Nobushige Arai, Nara, Japan

[73] Assignee: Sharp Kabushiki Kaisha, Osaka, Japan

[21] Appl. No.: 762,812

[22] Filed: Aug. 5, 1985

Related U.S. Application Data

[63] Continuation of Ser. No. 446,624, Dec. 3, 1982, abandoned.

[30] Foreign Application Priority Data

Dec. 7, 1981 [JP] Japan .......................... 56-182621[U]
Feb. 26, 1982 [JP] Japan .......................... 57-27389[U]

[51] Int. Cl.$^4$ .......................... F24J 2/56

[52] U.S. Cl. .......................... 126/450; 126/441; 126/447

[58] Field of Search .......................... 126/450, 443, 448, 446, 126/441, 449, 426, 447

[56] References Cited

U.S. PATENT DOCUMENTS

| | | | |
|---|---|---|---|
| 3,987,783 | 10/1976 | Powell | 126/450 |
| 4,015,586 | 4/1977 | Vroom et al. | 126/450 |
| 4,055,163 | 10/1977 | Costello et al. | 126/450 |
| 4,143,641 | 3/1979 | Christopher | 126/450 |
| 4,180,055 | 12/1979 | Hudnall | 126/450 |
| 4,191,168 | 3/1980 | Allen et al. | 126/441 |
| 4,203,425 | 5/1980 | Clark | 126/426 |
| 4,263,896 | 4/1981 | Zebuhr | 126/450 |
| 4,271,825 | 6/1981 | Schwob et al. | 126/450 |
| 4,290,412 | 9/1981 | Krauss | 126/450 |
| 4,333,448 | 6/1982 | Johnson | 126/450 |
| 4,347,836 | 9/1982 | Frank | 126/450 |

FOREIGN PATENT DOCUMENTS

| | | | |
|---|---|---|---|
| 2631771 | 1/1978 | Fed. Rep. of Germany | 126/450 |
| 2399630 | 4/1979 | France | 126/450 |
| 2463903 | 4/1981 | France | 126/450 |

*Primary Examiner*—James C. Yeung
*Attorney, Agent, or Firm*—Birch, Stewart, Kolasch & Birch

[57] ABSTRACT

A solar heat collector comprising an upper casing which receives the rays of the sun, a lower casing which is joined to the lower edge of the upper casing, side covers connected to both right and left edges of the upper and lower casings so as to seal the right and left edges of a heat collecting chamber which is formed between the upper and lower casings, and a fluid flow heat exchanger which is installed in the heat collecting chamber. The upper casing is comprised of an outer plate and an inner plate each constructed in the form of an inverted U from a transparent plastic material. The hollow insulating space which is formed between the outer and inner plates is subdivided by partitions into a plurality of compartments by use of a number. A solar heat collector comprising an upper casing, which receives the rays of the sun, formed from a transparent outer plate and a transparent inner plate, each of which is constructed in the form of an inverted U, with a hollow insulating space being formed therebetween. The insulating space is divided into compartments by a number of partitions and the upper casing has an outward facing connecting flange and the lower casing also has a flange for connecting it to the upper casing. A heating medium flow exchanger is installed in the heat collecting chamber formed between the upper and lower casings.

4 Claims, 20 Drawing Figures

10
C
40
41
38
37
47
50
52
51
37

FIG.13
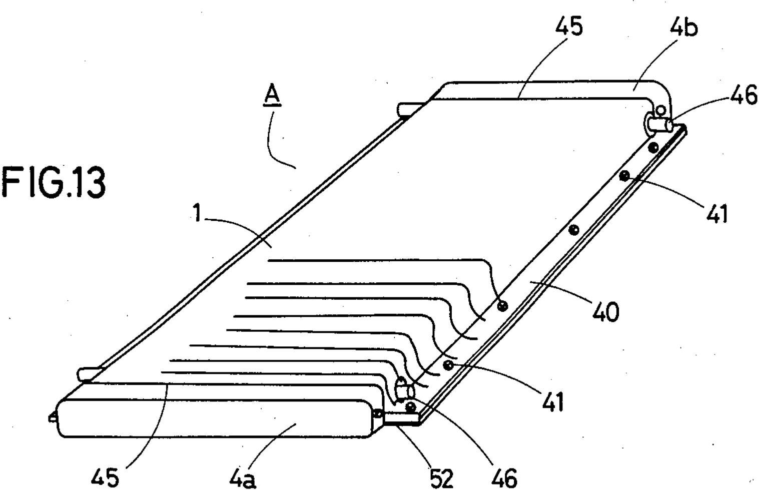
FIG.14
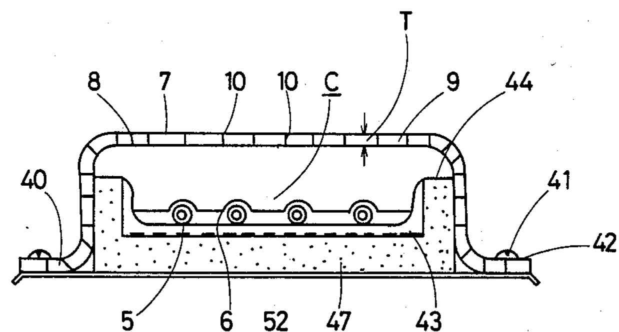
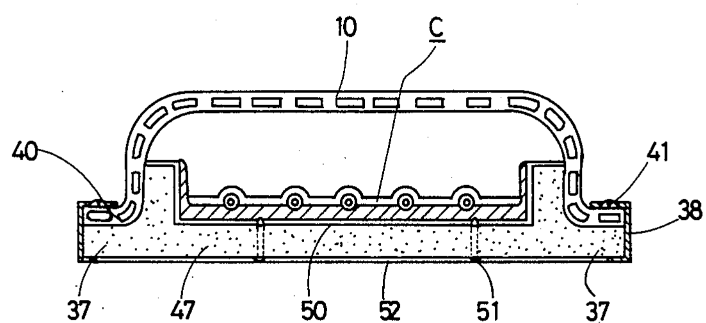
FIG.15

SOLAR HEAT COLLECTOR

This application is a continuation of application Ser. No. 446,624 filed on Dec. 3, 1982, abandoned.

BACKGROUND OF THE INVENTION

The present invention relates to an improvement in a solar heat collector.

Conventional heat collectors are equipped with an upper casing which is formed from a flat plate, and because of this, the heat which is collected, having passed through this casing, can easily dissipate back out through the casing. In addition, there is the drawback that the upper casing must be made from a thick sheet in order to have adequate strength.

Furthermore, conventional solar heat collectors have another drawback in that, because the seal of the casing which houses the heat collecting body is inadequate, rainwater is able to penetrate, and is absorbed by the insulating material, causing the insulating efficiency to be greatly impaired.

OBJECTS AND SUMMARY OF THE INVENTION

The present invention has as its object the construction of a solar heat collector in which the abovementioned defects are eliminated.

Furthermore, an additional object of the present invention is to increase the packing efficiency against water and moisture penetration into the solar heat collector, and to make the assembly of the upper and lower casings extremely easy, and with reduced cost.

Other objects and further scope of applicability of the present invention will become apparent from the detailed description given hereinafter. It should be understood, however, that the detailed description and specific examples, while indicating preferred embodiments of the invention, are given by way of illustration only, since various changes and modifications within the spirit and scope of the invention will become apparent to those skilled in the art from this detailed description.

One embodiment of a solar heat collector in accordance with the present invention is comprised of an upper casing which receives the rays of the sun, and a lower casing which is joined to the lower edge of said upper casing, with a side cover connected to both the right and left edges of said upper and lower casings, so as to seal the right and left edges of a heat collecting chamber enclosed by said upper and lower casings. A heat medium flow exchanger is installed in said heat collecting chamber. Furthermore, the upper casing is composed of an outer plate, and an inner plate each constructed in the form of an inverted U from a transparent plastic material and said outer and inner plates form a hollow insulating space between them in which multiple partition leaves are installed.

Another embodiment of the solar collector according to the present invention is comprised of a transparent plastic casing for receiving the rays of the sun formed in the shape of an inverted U, and a lower casing which is attached to the lower edges of said upper casing, and a heating medium flow exchanger provided in the interior of the chamber formed by the junction of said upper and lower casings. In addition, said upper casing has an outward-facing flange for connection purposes at both side edges thereof.

Still another embodiment of the solar collector according to the present invention is comprised of an upper casing for receiving the rays of the sun, as well as a lower casing joined to the lower edges of said upper casing, as well as a heating medium flow heat exchanger installed in the collecting chamber formed by said upper and lower casings. The upper casing has outer and inner plates made of transparent plastic, and in the insulating space formed between said outer and inner plates there are multiple partitions which form compartments in said insulating space. A compressed leaf is formed by pressure joining said outer and inner plates, which action results in sealing the open edge of said insulating space.

BRIEF DESCRIPTION OF THE DRAWINGS

The present invention will be better understood from the detailed description given hereinbelow and the accompanying drawings which are given by way of illustration only, and thus are not limitative of the present invention and wherein:

FIG. 13 is a perspective drawing of the body of one embodiment of a solar heat collector according to the present invention;

FIG. 14 is a sectional drawing of the embodiment of the solar heat collector of FIG. 13;

FIG. 15 is a sectional drawing of another embodiment of the solar heat collector according to the present invention;

DETAILED DESCRIPTION OF THE INVENTION

The following is a detailed description of embodiments of the present invention, with reference to the accompanying drawings.

Figure 1:
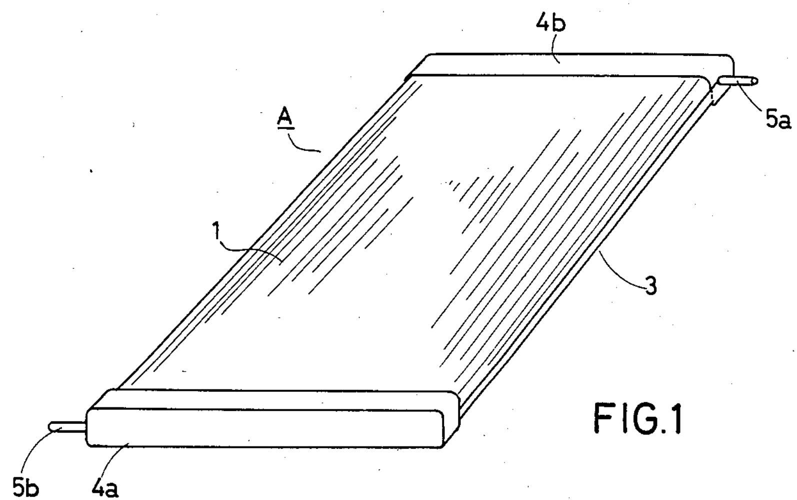
FIG. 1 is a perspective drawing of an entire body of one embodiment of the solar heat collector according to the present invention.
Figure 2:
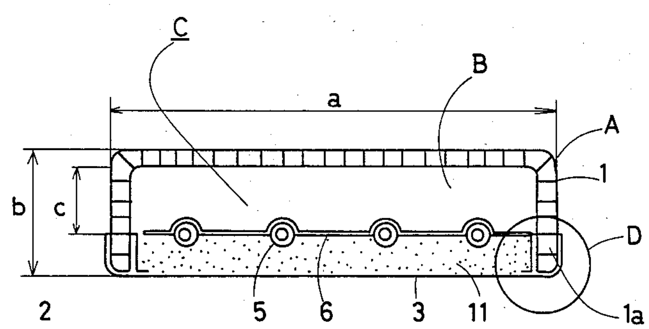
FIG. 2 is a sectional drawing of a solar heat collector according to the present invention.
Figure 3:
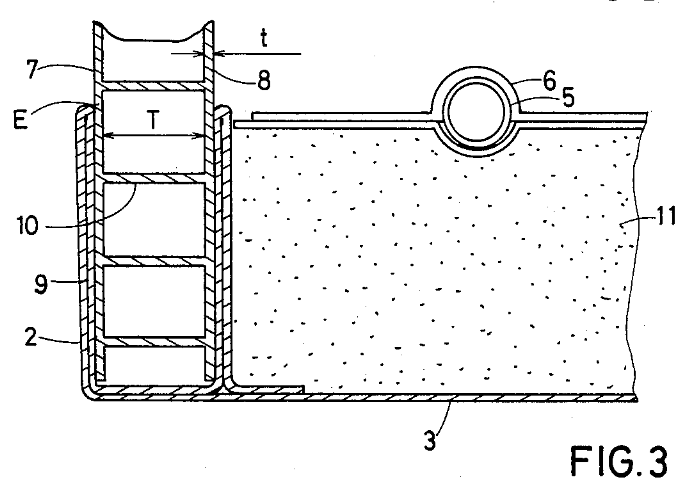
FIG. 3 is an enlarged sectional drawing of section-D of FIG. 2.

In FIGS. 1 to 4, a solar heat collector A is comprised of an upper casing 1, in the shape of an inverted U, for receiving the rays of the sun, together with a lower casing 3, which is inserted to engage and make an airtight seal with a U-shaped engaging section 2 in the lower edge section 1*a* of said upper casing 1. A side cover 4*a* and a side cover 4*b*, are joined externally in an airtight manner to the right and left hand edges of the abovementioned casing 1 and casing 2, so as to seal the right and left hand edges of the heat collecting chamber B enclosed by said casings. A heating medium flow heat exchanger C is installed within said heat collecting chamber B. The heat exchanger C is formed from a heat pipe 5 and a heat collecting plate 6 fixed on the upper surface of the heat pipe 5. In addition, the abovementioned upper casing 1 is composed of an outer plate 7 and an inner plate 8, as shown in FIG. 3, made from transparent plastic, together with multiple partitioning leaves 10 which partition off the insulating space 9 formed between the plate 7 and the plate 8.

Figure 4:
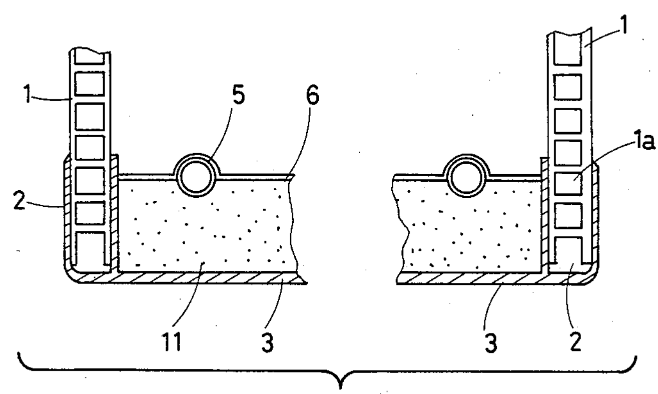
FIG. 4 and FIG. 5 are sectional drawings of another embodiment of the solar heat collector according to the present invention.

Furthermore, said upper casing 1, in this embodiment of the present invention, is formed in double sheeted construction from pressed acrylic, polyester, or polycarbonate resins, having a cross-sectional shape with a thickness t of 0.7 to 2 mm, and a distance T between the sheets of 6 to 9 mm, being the thickness T of space 9, as shown in FIG. 3. As shown in FIG. 2, the front and back sections are bent at right angles using heat, increasing the strength of the body by this inverted U-shaped construction. The dimensions are about 50 cm×200 cm, giving a surface area of about 1 square meter for receiving the solar rays. Furthermore, in FIG. 2, a= about 500 mm, b= about 60 to 70 mm, and c= about 20 to 30 mm. In addition, the abovementioned lower casing 3 is formed of a rustproof corrosion-resistant metal plate of which both edges are bent inwards, and by the process of splitting and bending these edges, the U-shaped engaging section 2 is formed. Furthermore, the upper casing 1 is glued to the lower casing 3 by the use of a glue E, as shown in FIG. 3. It is also acceptable to fabricate the lower casing 3 of a colored, opaque FRP or high density polyethylene plastic which is weatherproof and heat resistant. Colored steel plate, PVC-coated steel plate, or painted steel plate may also be used. In the case where said lower casing 3 is fabricated as ABS, polypropylene, polyethylene or similar materials, it is possible to integrally form the U-shaped engaging section 2 as shown in FIG. 4. Furthermore, it is also beneficial to coat the outer surface of the upper casing 1 with an ultraviolet ray screening film to improve its weathering ability. An insulating material 11 made of fiberglass and foamed styrene plastic is shown in the drawing, and because there are occasions when the heat collecting plate 6 reaches temperatures in the 200 deg. C. range it is insulated from the lower casing 3. However, when temperatures only in the 100 deg. C. range are to be reached, this insulation may be eliminated. A zigzag-shaped, copper section 5*a* forms the entrance to the heating medium circulating heat pipe 5, and a similar section 5*b* forms the exit, and these sections project outside the side covers 4*a* and 4*b* of the upper casing 1 and the lower casing 3. In addition, the abovementioned heat collecting plate 6 is treated with a selective heat absorbing film. Furthermore, the side covers 4*a* and 4*b* may be made of rubber or plastic.

In the solar heat collector constructed according to the above method, the rays of the sun shining onto the upper casing 1 are transmitted through the outer plate 7, the insulating space 9, the inner plate 8, into the interior of the heat collecting chamber B to add heat to the heat collecting plate 6. This added heat passes through the pipe wall of the heat pipe 5 and is absorbed by the heating medium inside the pipe. This medium, having absorbed the heat is transmitted through the pipe exit section 5*b* to, for example, a heat storage vessel. In addition, because the heat collecting chamber B is a sealed space, the heat collecting plate 6 will heat up to a temperature of about 200 deg. C., but being insulated by the inner plate 8 and outer plate 7 of the upper casing 1, and by the insulating space 9, this heat will not diffuse to the outside of the casing.

Figure 5:
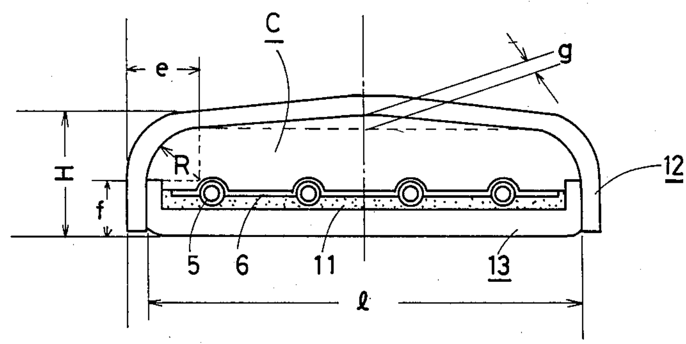

In another embodiment of the present invention as shown in FIG. 5, an inverted U-shaped upper casing 12 covers a lower casing 13, and as this upper casing 12 has a high side surface, in the most appropriate range of heat collecting efficiency, it has even a higher resistance to loading, wind pressure, and deformation. In FIG. 5, 1=500 mm to 600 mm, H=(70±10)mm, and when e=42 mm, and f=40 mm, R=(50±10)mm, and g=5 to 20 mm, and the back surface of the upper casing 12 has a medium or high shape and is formed into a dome. With the shape resulting from this range of dimensions, the upper casing 12 has exceedingly good shape-holding capabilities.

As can be clearly seen from the foregoing explanation, because the upper casing is constructed of an outer plate and an inner plate made of transparent plastic, and the insulating space between said outer and inner plates is divided into multiple compartments by means of partitions, the heat within the casing is prevented by the insulating space from dissipating to the outside of the casing, and the heat collecting efficiency is excellent. And in addition, because the upper casing is of a honeycomb structure, it can be expected to be exceptionally light, strong, and resistant to damage. Because the upper casing is constructed in the shape of an inverted U, it is especially easy to seal it against penetration by rainwater. It is also resistant to exterior load, wind pressure, and deformation, and is capable of continued highly efficient heat collection over an extended period of time without deterioration.

Figure 6:
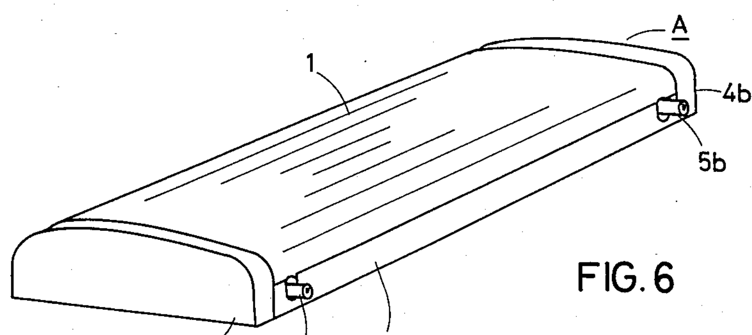
FIG. 6 is a perspective drawing of an entire body of still another embodiment of the solar heat collector according to the present invention.
Figure 7:
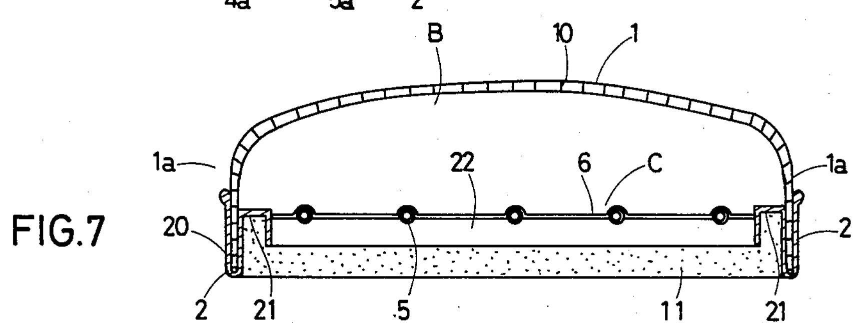
FIG. 7 is a sectional drawing of still another embodiment of the solar heat collector according to the present invention.
Figure 8:
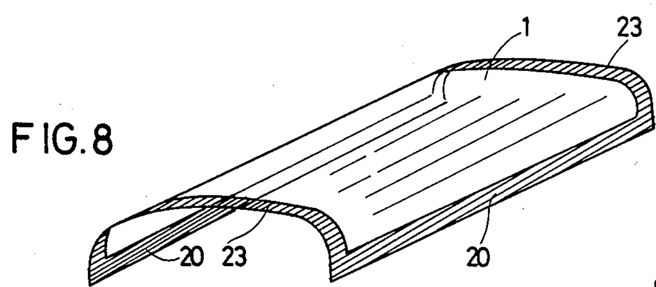
FIG. 8 is a perspective drawing of the upper casing of a solar heat collector according to the present invention as shown in FIG. 7.
Figure 9:
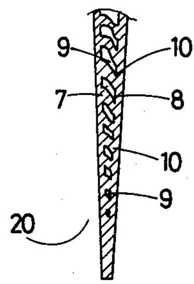
FIG. 9 is a sectional drawing of the side edges of the upper casing of still another embodiment of the solar heat collector according to the present invention.

We will now explain other embodiments of the solar heat collector according to the present invention as outlined in FIG. 6 to FIG. 9. FIG. 6 is a perspective drawing of an entire body of an embodiment of a solar heat collector. FIG. 7 is a sectional drawing of a solar heat collector; FIG. 8 is a perspective drawing of the upper casing of the embodiment of a solar heat collector shown in FIG. 7; and FIG. 9 is a sectional drawing of the side edges of the upper casing of an embodiment of a solar heat collector according to the present invention.

Both edges 1*a*, 1*a* of the casing 1, as shown in FIG. 9, are joined by pressure to the outer plate 7 and the inner plate 8 in a tapered form, and the tip of the tapered section is sealed to form a compressed leaf 20. As shown in FIG. 8, the forward and rear edges of the upper casing 1 are also joined by pressure to the outer plate 7 and the inner plate 8, to form a compressed leaf 23 which seals off the insulating space 9. Therefore, the insulating space 9 of the upper casing 1 becomes completely sealed off, so that water is unable to enter the insulating space 9, while at the same time, air convection within the insulating space 9 is greatly reduced, increasing its insulating ability. Also, because no water penetrates, no water droplets, which reduce sunlight penetration, can form between the outer plate 7 and the inner plate 8.

The previously mentioned lower casing 3 is formed in a U-shape, and on both sides a reinforcing sash 21, which forms the U-shaped engaging section 2, is affixed. An insulating material 22 made of fiberglass and foamed styrene plastic is shown in the drawing. Because the space 9 is sealed, air convection is minimized, and the insulating capabilities are high. Furthermore, because it is difficult for water droplets to form within the space 9, the sunlight transmission is good. Also, both edges 1*a*, 1*a* of the upper casing 1 form the tapered compressed leaf 11, 11, and because of this, the engaging section 2 of the lower casing 3 is easily engaged.

The explanation of the other embodiments of the solar heat collector according to the present invention is as follows.

Figure 10:
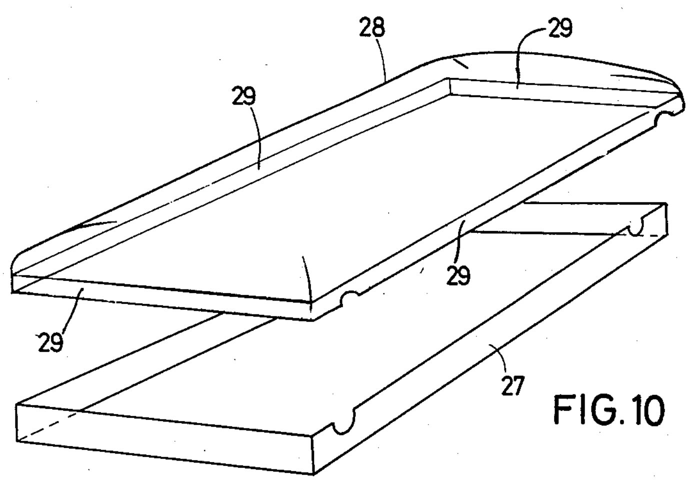
FIG. 10 is a simplified perspective drawing of another embodiment of the solar heat collector according to the present invention.

(1) FIG. 10 shows a heat collector in which an upper casing 28 outwardly engages a lower casing 27, and in which a compressed leaf 29 connects the four sides.

Figure 11:
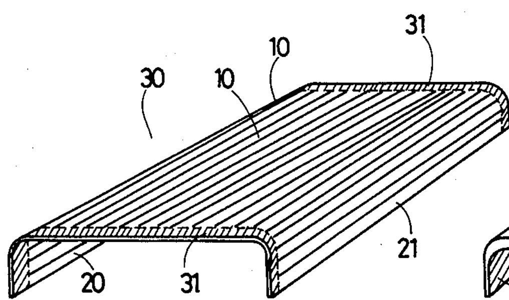
FIG. 11 and FIG. 12 are perspective drawings of another embodiment of a solar heat collector according to the present invention.

(2) FIG. 11 shows an upper casing 30 which is provided with vertical partition leaves 10, and of which the forward and back edges form a compressed leaf 31. In this case, both the side edges 21 and the partition 10 form one sealed space.

Figure 12:
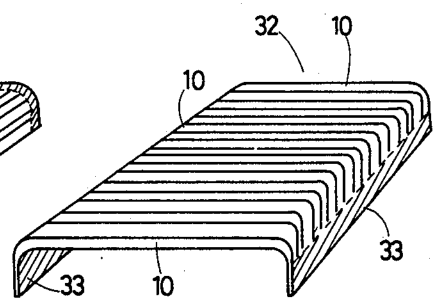

(3) FIG. 12 shows an upper casing 32, which is provided with horizontal partition leaves 10, and of which both edges are joined by pressure to form a compressed leaf 33. In this case, both the front and back edges and the partition 10 form one sealed space.

As can be clearly seen from the above explanation, in this embodiment of the present invention, the upper casing of the solar heat collector is formed of a transparent plastic outer plate and inner plate, and the insulating space formed between said outer plate and inner plate is compartmentalized by the use of multiple partitions, and the entrance to this insulating space is sealed by means of a compressed leaf. Because of this construction, especially in the upper casing, because the insulating space is tightly sealed the insulating capabilities are excellent, and, as an added benefit, no water droplet prevention additives are required to keep the plastic from fogging up. Also, the sunlight penetration ability is maintained, and it is possible to increase the heat collecting capabilities.

Another embodiment of the present invention is described as follows.

FIG. 13 is a perspective drawing of the body of one embodiment of a solar heat collector according to the present invention.

FIG. 14 is a sectional drawing of the embodiment of FIG. 13.

In FIG. 13 and FIG. 14, there is shown a solar heat collector A, which is comprised of an upper casing 1, for collecting the rays of the sun, constructed in the form of an inverted U; and a connecting flange 40 formed at the bottom edges of said upper casing 1. A flat bottom plate 52 is affixed to the connecting flange 40 and a collecting chamber B is formed between the upper casing 1 and the bottom plate 52. Side covers 4*a* and 4*b* seal and make airtight the outside of both the right and left edges of the upper casing 1 and the bottom plate 52, thus effectively sealing the right and left edges of the collecting chamber B. A lower casing 47, in the form of a receptacle is positioned inside the aforementioned collecting chamber B. A heat collecting body (heat exchanger) C is disposed within the heat collecting chamber. Some bolts 41 affix the bottom plate 52 to the flange 40 of the upper casing 1 through some metal washers 42. The secured section of said bottom plate 52 slants downward to the outside and effectively prevents the entry of water into the chamber. An insulating material 43 e.g., a foamed plastic insulating material, glass wool or a similar material, is spread on the inside bottom surface of the lower casing 47. An L-shaped reinforcing metal fitting 44 runs from the upper edge of the lower casing 47 to the top of the inside side wall. Also, in FIG. 13, a sealed section 45 and a header pipe 46 are shown. Because rainwater is directed to the outside of bottom plate 52 from upper casing 1 practically no water will enter the chamber. But in case some water does enter at the junction of the upper casing 1 and the bottom plate 52, because the lower casing 47 is in the form of a receptacle, the water will not enter the heat collecting body C in the inside of the lower casing 47 and the insulating efficiency is maintained. Also, in the case where the solar heat collector A is secured to a frame, because the bolts 41 can be utilized to serve the dual purpose of affixing the upper casing A to the bottom plate 52 and securing the solar heat collector A to the stand, the assembly of the system becomes very simple. In addition, because the upper casing 1 and the bottom plate 52 are combined, the expansion difference from heat expansion is stress relieved, and stress cracking and deformation in the upper casing 1 can be minimized.

FIG. 15 is a sectional drawing of another embodiment of the solar heat collector according to the present invention. In this embodiment a peripheral lip 37 is formed at both sides of a lower casing 47, and a flange 40 of the upper casing 1 is joined to the bottom plate 52 by means of an inverted U-shaped angle iron 49 and the bolts 41 pass through the flanges of the inverted U-shaped angle iron 49 from the top to the bottom. A bottom plate angle iron 50, in the form of a squared U with outward protruding flanges at its top, is provided on the inside surface of the lower casing 47, and the bottom plate 52 is fastened to the lower part of the lower casing by means of screws 51, to strengthen the body of the heat collector A.

Next, a further embodiment of a solar heat collector according to the present invention, which may be easily attached to a frame for installing on the roof of a house, or similar location, will be explained.

Figure 16:
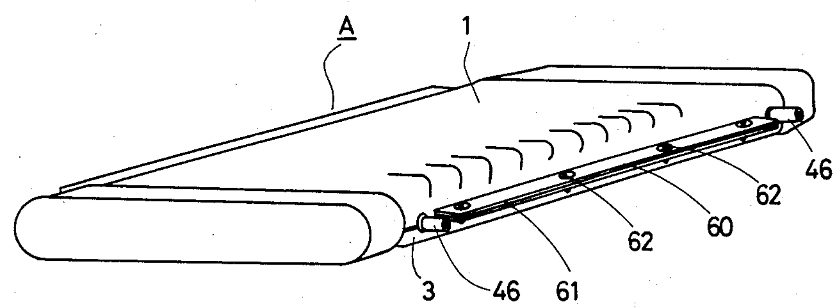
FIG. 16 is a perspective drawing of another embodiment of a solar heat collector according to the present invention.
Figure 17:
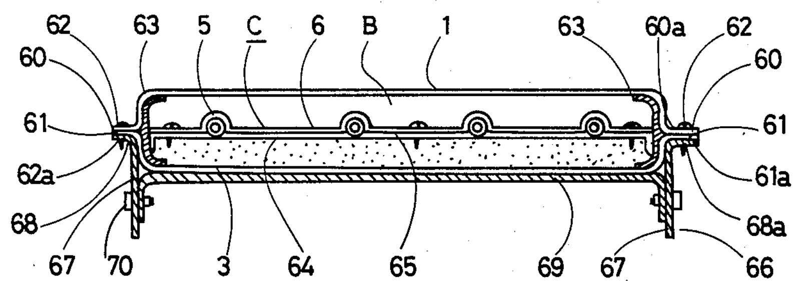
FIG. 17 is a sectional drawing of the embodiment of a solar heat collector according to the present invention of FIG. 16.

FIG. 16 is a perspective drawing, and FIG. 17 is a sectional drawing of this embodiment. These figures will be referred to in making the explanation. In these drawings there are some connecting flanges 60 and 61 which extend outward in a horizontal direction from both side edges of the upper casing 1 and the lower casing 3. As shown in FIG. 17, these flanges 60 and 61 are mated and the heat collecting chamber B is formed as the inner section of the upper casing 1 and the lower casing 3. Bolts 62 secure the mated flanges 60 and 61, and are inserted through holes 68*a* drilled in the location where said flanges 60 and 61 correspond.

In FIG. 17, a plate 62 is an inverted U-shaped side section plate making contact with the inside side surface of the upper casing 1 and the lower casing 3, and appropriately spaced between them is installed a sash 64. Furthermore, both edges of the side section plate 63 and the sash 64 are spot welded together. The sash 64 is secured to a heat collecting plate 6 by means of screws 65.

A frame 66 is used when the solar heat collector A is installed on the roof of a house or similar location, and a pair of braces 67 are formed from a supporting perforated leaf 68 by bending the upper edges in an outward direction. A supporting angle iron 69 is installed between the pair of braces 67, and is joined to both edges of the braces 67 by means of some screws 70.

When the abovementioned heat collector A is to be attached to the frame 66, the lower casing 3 is placed above the reinforcing angle iron 69, and at the same time the connecting flange 61 is positioned above the perforated leaf 68 of the pair of braces 67. Next, some insulating material 11 and the combined side section plate 63 and the sash 64, in that order or in reverse order, are inserted into lower casing 3, and a heat exchanger C is positioned above said sash 64, and a heat collecting plate 6 is secured to the sash 64 by means of some screws 65. After this, the upper casing 1 is placed on top of the lower casing 3, and they are joined at the flanges 60 and 61 by means of some bolts 62, and the flanges 60 and 61 of the upper and lower casings are attached to the perforated supporting leaf 68. In other words, some permanent holes 68*a* corresponding to the holes drilled in the flanges 60 and 61 are drilled in the perforated supporting leaf 68, and the bolts 62 are passed through the holes 62*a* and 68*a* drilled through the flanges 60 and 61, and are also passed through the permanent holes 68*a* and securely tightened using nuts 62*a*. If the installation is carried out in this way, the upper casing 1 and the lower casing 3 are mated together and the solar heat collector A is secured to its frame and assembled at the same time, and the installation is easily accomplished. Also, under the conditions shown in the previously discussed FIG. 17, it is acceptable to install the solar heat collector above frame 66, loosen the bolts 62 to remove it, and reinstall it on frame 66.

A solar heat collector constructed as outlined above is planned for simplification of assembly and design, and also during transportation, these units can be stacked to occupy a small space, and it is particularly designed for light weight. Because the product is of honeycomb construction for air insulation it has strength and flexibility, and has adequate resistance to loading and deformation. Also, because it is equipped with flanges, the metal fittings of the frame can serve a dual purpose and be used to reinforce the bottom surface. Also, the unit can be easily installed on the frame.

A still further embodiment of the present invention is described as follows. With an upper casing in the form of an inverted deep dish having a flange around the peripheral edges, the heat collecting body and insulating material, etc. supported by the bottom plate are covered, and with the said flange the upper casing and bottom plate are joined and secured to form a watertight body. The drawbacks of the conventional units are thus eliminated.

The following is a detailed description of this embodiment of the present invention with reference to the drawings.

Figure 18:
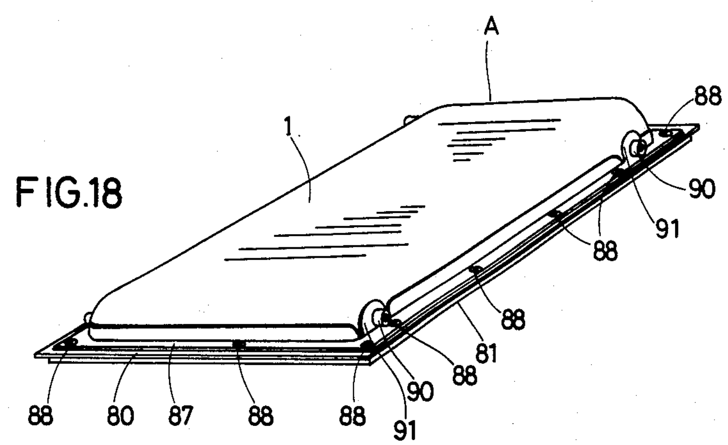
FIG. 18 is a perspective drawing of another embodiment of a solar heat collector according to the present invention.

FIG. 18 is a perspective drawing of a solar heat collector A, in which an upper casing 1 and a bottom plate 81 are joined by means of flange 80 attached to said upper casing. As shown in the sectional drawing of FIG. 19, the upper casing 1 is a rust-proofed, hollow, transparent polycarbonate plastic sheet, having good insulation characteristics from the contained air, which is vacuum-formed into an inverted deep dish shape provided with the flange 80 around the entire peripheral edge, in the outer outward direction.

The bottom plate 81 is of almost a flat form, which, by means of a perforated member 81*a*, separates the flange 86, and provides the outside circumference. On the inside surface of this bottom plate, there is provided an insulating sheet 82 with a set thickness, a copper water pipe 83, header pipes 13 at both ends of said water pipe 83, and an aluminum line 85. The bottom plate assembly supports the heat collector A.

Packing 91 made from ethylene propylene rubber (EPDM) is used to seal the area where the header pipes 90 enter the upper casing. In the drawing, there is shown the aluminum foil heat reflector 92, and a protective film 93 for an insulating sheet 82.

Figure 19:
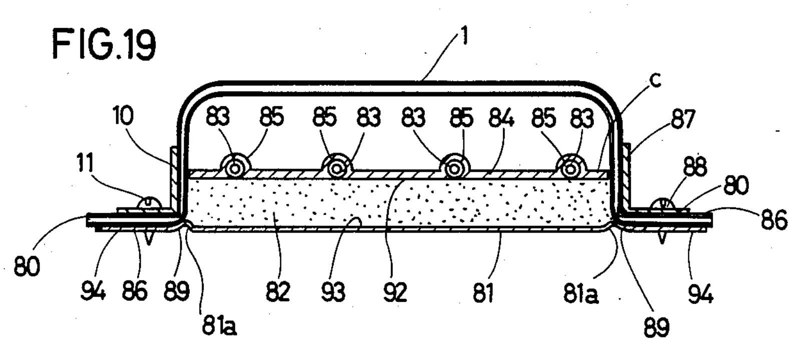
FIG. 19 is a sectional drawing of the embodiment of the solar heat collector of FIG. 18.
Figure 20:
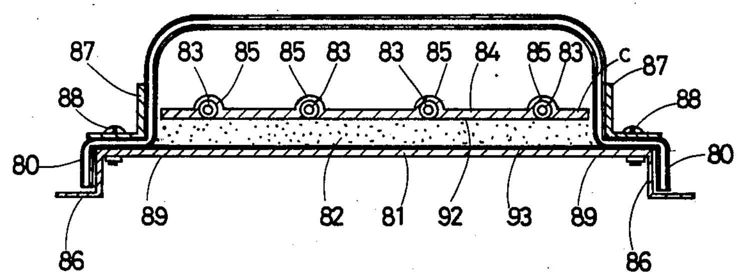
FIG. 20 is a sectional drawing of another embodiment of a solar heat collector according to the present invention.

FIG. 20 is a sectional drawing of another embodiment of a solar heat collector according to the present invention which differs from the embodiment shown in FIG. 19 inasmuch as the flange 80 is not simply flat and horizontal, but is bent in an inverted L-shape, while at the same time the bottom plate 81 is bent so that its protrusion corresponds with the flange. There is a space provided between both flanges 80 and 86, which blocks out water, providing additional water and vapor exclusion efficiency.

Because the embodiment of the solar heat collector according to the present invention constructed as described above has an upper casing 1 in the form of an inverted deep dish, equipped with a flange from an air-insulated fabricated sheet, it has considerable shape-holding capability, has a large load resisting ability of 120 to 150 $Kg/m^2$, and is of a suitable construction for collecting heat. Also, because the bottom plate 81, by means of the perforated member 81*a*, or by being bent in an elongated Z-shape, is provided with an outward overhanging flange 86 corresponding to the flange of the upper casing, after installation of the insulating sheet 82 and heat collecting body C, said bottom plate is covered with the upper casing 1, and if the flange 80 of the upper casing 1 is fixed to the flange 86 of the bottom plate with screws or by some other means, the upper casing 1 completely isolates the heatd collecting body C from the outside. Thus any water droplets attached to the upper casing 1 are not allowed to enter.

The previously mentioned aluminum line 85 is treated with a selective absorption film, and on both sides of the bent section covering the copper water pipe the line 84 has a winged shape, and these two lines are installed close together. The flange 80 of the upper casing 1 is placed above the flange 86 of the bottom plate 81. The upper casing 1 covers the heat collecting body C supported upon the bottom plate, and the support plate of the L-shaped section is placed on the outer circumference of the upper casing 1 and on the upper surface of the bottom plate flange. The support plate 87, the upper plate 1, and the bottom plate 80 are secured together by screws 88. In all these cases it is effective to utilize the seal packing 94.

In addition, in order to prevent convection currents of air from passing through minute spaces, and moisture from entering into the air space of the upper casing and forming droplets of water, on the bent line of the flange from the side perimeter of the upper casing, the hollow transparent sheet from which the upper casing is fabricated is glued or otherwise secured to form the glued bent section 89. The glued bent secion 89, on the outside of the perforated member 81*a*, is glued together with the insulating sheet, and it is acceptable to make sure that the inside and outside are tightly sealed and isolated. Also, at a part of the bent section 89, it is desirable to make a tight seal after making certain that the support plate is pushed in and secured to the perforated member 81*a*.

Also, as shown in the drawings, the flange 80 is lengthened by the support plate and the bottom plate flange 86, and water droplets attached to the upper casing are prevented from entering inside of the equipment.

The support plate 87 not only makes a reliable joint with the upper casing and the flange of the bottom plate, but it protects the bent section 89 of the upper casing and strengthens its watertightness feature.

The invention being thus described, it will be obvious that the same may be varied in many ways. Such variations are not to be regarded as a departure from the spirit and scope of the invention, and all such modifications are intended to be included within the scope of the following claims:

What is claimed is:

1. A solar heat collector consisting of a transparent upper casing in the form of an inverted U shape configuration for absorbing solar energy said upper casing having inner and outer parallel plates conforming to said inverted U-shape configuration which inner and outer plates define an insulating chamber disposed therebetween said chamber being subdivided by a plurality of partition means into a plurality of compartments throughout said entire chamber, said upper casing being fabricated from a plastic selected from the group consisting of an acrylic resin, a polyester resin and a polycarbonate resin;

a lower casing which is joined to said inverted U-shaped upper casing so as to define a sealed heat collecting chamber disposed therebetween;

a heat exchange means installed in said heat collecting chamber formed between said upper casing and said lower casing for conveying a heat exchange medium therethrough including means for introducing and removing said heat exchange medium into and out of said heat exchange means;

a heat collecting plate extending across said heat collecting chamber for transmitting absorbed heat to said heat exchange means for heating said heat exchange medium being conveyed therethrough;

said inverted U-shaped upper casing having an outwardly extending peripheral connecting flange edge portion and said lower casing having a corresponding outwardly extending peripheral connecting flange edge portion, said peripheral flange of said upper casing being fitted into the corresponding flange on said lower casing lateral to said heat collecting chamber.

2. The solar heat collector according to claim 1 further including a shaped fitting plate to secure said flanges of the upper casing and said lower casing where they fit together.

3. The solar heat collector of claim 1 wherein said heat collecting plate subdivides the heat collecting chamber into an upper zone and a lower zone, said lower zone containing the heat exchange means, said lower zone further containing insulating material.

4. The solar heat collector of claim 1 wherein the heat collecting plate is provided with a heat absorbing film.

* * * * *